US010430937B2

United States Patent
Giering et al.

(10) Patent No.: US 10,430,937 B2
(45) Date of Patent: Oct. 1, 2019

(54) AUTOMATED MATERIAL CHARACTERIZATION SYSTEM INCLUDING CONDITIONAL GENERATIVE ADVERSARIAL NETWORKS

(71) Applicant: United Technologies Corporation, Farmington, CT (US)

(72) Inventors: Michael J. Giering, Bolton, CT (US); Ryan B. Noraas, Hartford, CT (US); Kishore K. Reddy, Vernon, CT (US); Edgar A. Bernal, Webster, NY (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 54 days.

(21) Appl. No.: 15/714,339

(22) Filed: Sep. 25, 2017

(65) Prior Publication Data

US 2019/0096056 A1  Mar. 28, 2019

(51) Int. Cl.
*G06T 7/00* (2017.01)
*G06T 7/13* (2017.01)
(Continued)

(52) U.S. Cl.
CPC .......... *G06T 7/0006* (2013.01); *G06K 9/6202* (2013.01); *G06K 9/6289* (2013.01);
(Continued)

(58) Field of Classification Search
CPC .......... G06T 7/0006; G06T 7/12; G06T 7/13; G06T 7/001; G06T 2207/20076; G06T 2207/20081; G06T 2207/20084; G06T 2207/20152; G06T 2207/20221; G06T 2207/20136; G06T 2207/30164; G06K 9/6202; G06K 9/6289; G06K 9/4604; G06K 9/36
See application file for complete search history.

(56) References Cited

U.S. PATENT DOCUMENTS 7,516,022 B2 4/2009 Lee
2017/0169567 A1* 6/2017 Chefd'hotel ....... G06K 9/00127
(Continued)

FOREIGN PATENT DOCUMENTS

WO 1997023776 A1 7/1997

*Primary Examiner* — Ping Y Hsieh
(74) *Attorney, Agent, or Firm* — Cantor Colburn LLP

(57) ABSTRACT

A material characterization system includes an imaging unit, a material characterization controller, and an imaging unit controller. The electronic imaging unit generates a test image of a specimen composed of a material. The electronic material characterization controller determines values of a plurality of parameters and maps the parameters to corresponding ground truth labeled outputs. The mapped parameters are applied to at least one test image to predict a presence of at least one target attribute of the specimen in response to applying the learned parameters. The test image is convert to a selected output image format so as to generate a synthetic image including the predicted at least one attribute. The electronic imaging unit controller performs a material characterization analysis that characterizes the material of the specimen based on the predicted at least one attribute included in the synthetic image.

8 Claims, 6 Drawing Sheets

(51) Int. Cl.
  *G06T 7/12* (2017.01)
  *G06K 9/62* (2006.01)
(52) U.S. Cl.
  CPC ............... *G06T 7/001* (2013.01); *G06T 7/12* (2017.01); *G06T 7/13* (2017.01); *G06T 2207/20076* (2013.01); *G06T 2207/20081* (2013.01); *G06T 2207/20084* (2013.01); *G06T 2207/20152* (2013.01); *G06T 2207/20221* (2013.01); *G06T 2207/30136* (2013.01); *G06T 2207/30164* (2013.01)

(56) References Cited

U.S. PATENT DOCUMENTS

2018/0107928 A1* 4/2018 Zhang ..................... G06K 9/46
2018/0341836 A1* 11/2018 Lim ..................... G06T 3/4053

\* cited by examiner

AUTOMATED MATERIAL CHARACTERIZATION SYSTEM INCLUDING CONDITIONAL GENERATIVE ADVERSARIAL NETWORKS

BACKGROUND

Material inspection and characterization of alloys is required to ensure quality for many engineering applications. This is especially true for high stress aerospace components where material failure in operation can have significant consequences. A process is needed for a quick and objectively accurate inspection of materials such as alloys, for example, to ensure material quality.

BRIEF DESCRIPTION

According to a non-limiting embodiment, a material characterization system includes an imaging unit, a material characterization controller, and an imaging unit controller. The electronic imaging unit generates at least one test input image of a specimen composed of a material. The electronic material characterization controller determines values of a plurality of functional parameters that specify a functional mapping, and maps the at least one test input image of the specimen to at least one output image based on the functional mapping specified by the determined parameters. The electronic material characterization controller further predicts a presence of at least one target attribute of the specimen in response to applying the functional mapping, analyzes the at least one output image, and converts the at least one output image to a selected output image format so as to generate a synthetic image including the predicted at least one attribute. The electronic imaging unit controller performs a material characterization analysis that characterizes the material of the specimen based on the predicted at least one attribute included in the synthetic image.

The material characterization system further comprises a feature wherein the synthetic image is a fused synthetic image including a plurality of predicted attributes that are different from one another.

The material characterization system further comprises a feature wherein the material characterization controller includes a plurality of conditional generative adversarial networks (CGANs) and, each CGAN and among the plurality of CGANs configured to predict the presence of a respective attribute.

The material characterization system further comprises a feature wherein the plurality of CGANs and includes a first CGAN and a second CGAN. The first CGAN is configured to predict a presence of at least one grain element in the specimen, and to generate a first synthetic image including the predicted at least one grain element. The second CGAN is configured to predict an edge location of the at least one grain element, and to generate a second synthetic image including the predicted edge location of the at least one grain element.

The material characterization system further comprises a feature wherein the imaging unit controller includes an electronic image fusing unit that superimposes the second synthetic image with the first synthetic image to generate the fused synthetic image.

The material characterization system further comprises a feature wherein the superimposition of predicted edge locations with predicted grain elements identifies at least one individually segmented grain and.

The material characterization system further comprises a feature wherein the imaging unit controller is configured to perform at least one post-processing operation on the fused synthetic image.

The material characterization system further comprises a feature wherein at least one post-processing operation on the fused synthetic image includes at least one of a watershed analysis, a post-segmentation operation, a synthetic image correcting operation, and a grain filtering operation.

The material characterization system further comprises a feature wherein the material characterization analysis includes characterizing at least one of a strength of the material, a fatigue rate of the material, and fracture growth rate.

The material characterization system further comprises a feature wherein the imaging unit controller generates characterized image data based on the fused synthetic image and the material characterization analysis.

The material characterization system further comprises a display unit that displays a characterized image based on the characterized image data.

The material characterization system further comprises a feature wherein the characterized image includes at least one graphical indicator that indicates at least one of the strength of the material, the fatigue rate of the material, and fracture growth rate.

The material characterization system further comprises a feature wherein the material characterization controller executes a training process prior to generating the test image.

The material characterization system further comprises a feature wherein the material characterization controller learns the modeled parameters in response to identifying known attributes of a previously analyzed specimen based on a comparison between the real image and the known ground truth image.

The material characterization system further comprises a feature wherein the learned ground truth images include the known ground truth attributes.

According to another non-limiting embodiment, a method of characterizing a material of a specimen comprises generating, via an electronic imaging unit, a test image of the specimen, and determining values of a functional plurality of parameters that specify a functional mapping and mapping the at least one test input image of the specimen to at least one output image based on the functional mapping specified by the determined parameters. The method further comprises predicting, via an electronic material characterization controller, a presence of at least one target attribute of the specimen in response to applying the functional mapping specified by the determined parameters to analyze the at least one output image. The method further comprises converting, via the electronic material characterization controller, the at least one output image to a selected output image format so as to generate a synthetic image that includes the predicted at least one attribute, and performing, via the electronic imaging unit controller, a material characterization analysis that determines at least one physical characterization of the material of the specimen based on the predicted at least one attribute included in the synthetic image. The method further comprises generating, via the electronic imaging unit controller, characterized image data based on the fused synthetic image and the material characterization analysis, and displaying, via a display unit, a characterized image based on the characterized image data, the characterized image including a graphical indicator indicating the at least one physical characterization.

The method further comprises a feature wherein generating the synthetic image includes fusing together a plurality of predicted attributes that are different from one another to generate a fused synthetic image.

The method further comprises a feature wherein predicting the presence of at least one target attribute of the specimen further comprises predicting, via a first conditional generative adversarial network (CGAN), a presence of at least one grain element in the specimen, and generating, via the first CGAN, a first synthetic image including the predicted at least one grain element. The method further comprises predicting, via a second CGAN, an edge location of the at least one grain element, and generating, via the second CGAN, a second synthetic image including the predicted edge location of the at least one grain element.

The method further comprises a feature wherein fusing together a plurality of predicted attributes includes superimposing the second synthetic image with the first synthetic image to generate the fused synthetic image.

The method further comprises a feature wherein predicting the at least one attribute further comprises identifying at least one individually segmented grain and included in the specimen represented by the test image based on the superimposition of the predicted edge location and the predicted at least one grain element.

BRIEF DESCRIPTION OF DRAWINGS

The following descriptions should not be considered limiting in any way. With reference to the accompanying drawings, like elements are numbered alike.

DETAILED DESCRIPTION

Figure 1:
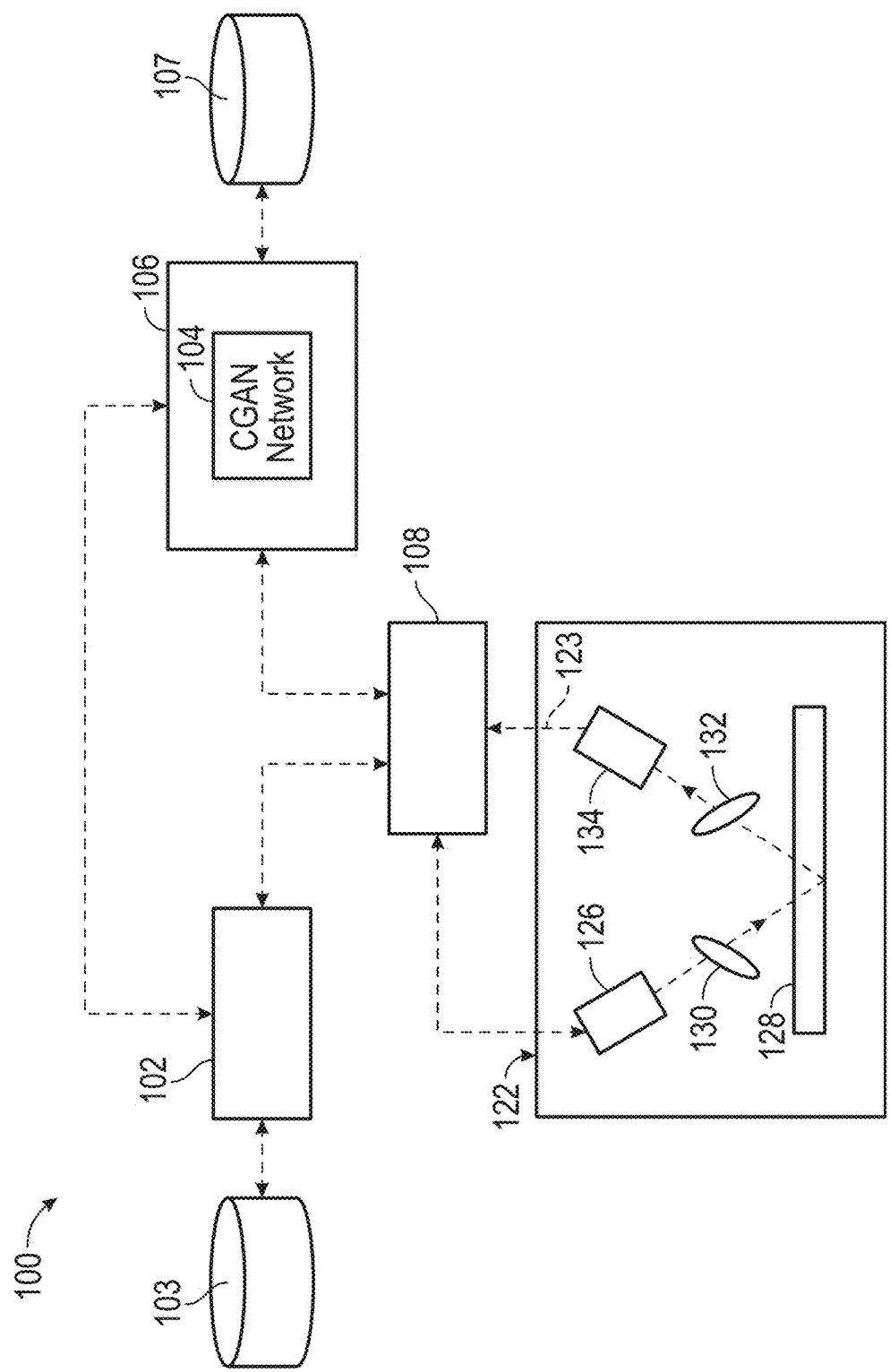
FIG. 1 is a block diagram of a material characterization system capable of performing automated material characterization of a specimen based on conditional generative adversarial networks (CGANs) according to a non-limiting embodiment.

A detailed description of one or more embodiments of the disclosed apparatus and method are presented herein by way of exemplification and not limitation with reference to the Figures.

Generative adversarial networks (GANs) are a branch of unsupervised machine learning, and is implemented by a system of two neural networks competing against each other in a zero-sum game framework. The two neural networks are created and learning is performed (i.e., the networks are trained) through their mutual competition. The first neural network is implemented as generator system, and is referred to as the Generator (G). The second neural network is implemented as discriminator system, and is referred to as the Discriminator (D). The Generator begins with a random input and attempts to generate synthetic or fake images. The Discriminator receives real authentic images, along with the synthetic images from the Generator. Accordingly, the Discriminator outputs a binary decision indicating a prediction as to whether the image received from the Generator is real or synthetic (i.e., fake). As the Discriminator improves at distinguishing between real image and synthetic images, the Generator improves at generating images to fool the Discriminator. Equilibrium is reached when the Generator can no longer fool the Discriminator. No domain knowledge needs to be explicitly included. Image features are learned automatically. The fitness function for the generator is learned and not predefined. In conditional GANs (CGANs), instead of generating a sample from a random input, the Generator generates an output image conditioned on an input image. Such a system can then be trained to learn mappings from the input image space to the output or generated image space. The training process consists in learning the optimal set of values of a plurality of parameters that determine the mapping. In other words, the mapping can be thought of as a functional mapping with parameters that are adjustable, and are learned based on a set of training samples.

Various embodiments described herein provide an automated material characterization system that employs CGANs to learn one-to-one mappings from an input space containing images of specimens such as, for example, material alloys to an output space containing labeled images of said specimens. The automated material characterization system is conditioned on input images and fed the corresponding ground truth labeled outputs to train a conditional generative model. In at least one embodiment, the automated material characterization system determines or learns the values of a plurality of parameters that optimally map input images to their corresponding ground truth labeled outputs; once the parameters are learned, the resulting functional mapping can be applied to each new test image to convert it to a desired output image format e.g., a labeled image). In this manner, the model can learn to properly generate and label future inputs to perform material characterization.

With reference now to FIG. 1, a material characterization system 100 capable of performing automated material characterization of a specimen 128 (e.g., metal workpiece) based on conditional generative adversarial networks (CGANs) 104 is illustrated according to a non-limiting embodiment. The material characterization system 100 includes an optical imaging unit 122, an imaging unit controller 108, a label controller 102, and a material characterization controller 106. Any one of the imaging unit controller 108, label controller 102, and material characterization controller 106 can be constructed as an electronic hardware controller that includes memory and a processor configured to execute algorithms and computer-readable program instructions stored in the memory.

In at least one example embodiment, the optical imaging unit 122 is constructed based on an electron beam-based imaging unit 122. In this example, the optical imaging unit 122 includes an electron beam source 126, one or more beam elements 130 and 132 (e.g. optical lenses), and a detector 134.

The electron beam source 126 is configured to generate electrons that are focused to the specimen 128 by one or more elements 130. The electron beam source 116 may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen 128 (e.g., secondary electrons) can be focused by one or more elements 132 to detector 134. The detector 134 processes the secondary electrons and generates image data 123 indicative of a real image. One or more elements 132 may include, for example, a scanning subsystem, which may be the same scanning subsystem included in element(s) 130. Although the electron column is shown in FIG. 1a as being configured such that the electrons are directed to the specimen at an oblique angle of incidence and are scattered from the specimen at another oblique angle, it is to be understood that the electron beam may be directed to and scattered from the specimen at any suitable angles.

Figure 2:
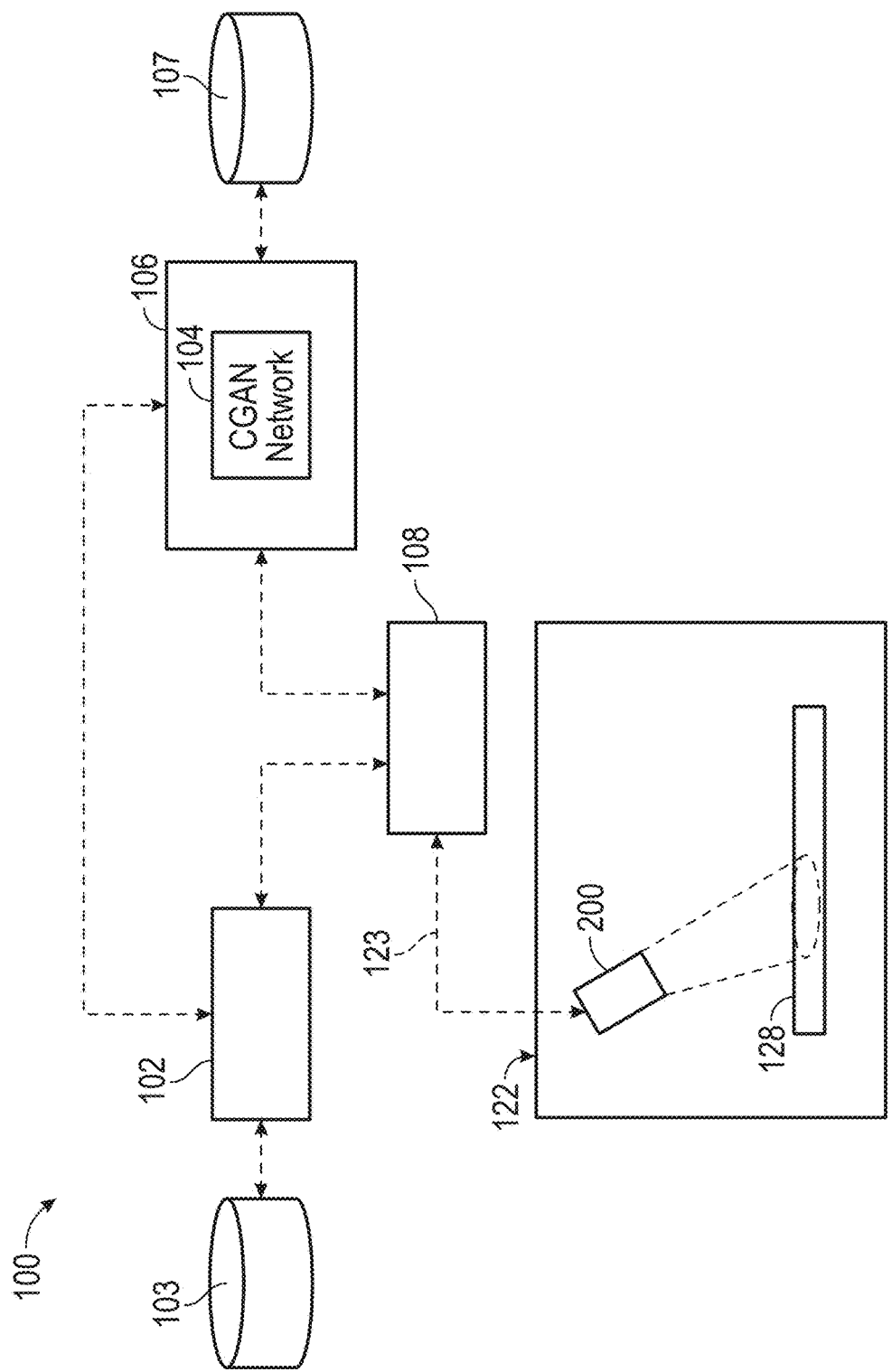
FIG. 2 is a block diagram of a material characterization system capable of performing automated material characterization of a specimen based on conditional generative adversarial networks (CGANs) according to another non-limiting embodiment.

Although the optical imaging unit 122 is described above as being a light-based or electron beam-based imaging subsystem, the optical imaging unit 122 can be constructed as any optical image-based system capable of capturing material-based characteristics such as, for example, metal grain volume per area and individual metal grain sizes. FIG. 2, for example, illustrates an optical sensor-based imaging unit 122. Unlike FIG. 1 which generates image data 123 based on the detection of electrons or ions, the optical sensor-based imaging unit 122 employs an optical sensor system 200 that can directly capture an image of the specimen 128. The captured image is delivered as image data 123 to the material characterization controller 105, where it can then analyze the real image and/or store the image in a memory unit or database 107 for future reference and retrieval.

The imaging unit controller 108 is in signal communication with the label controller 102, and the material characterization controller 106. The imaging unit controller 108 is also in signal communication with the imaging unit 122. For example, the imaging unit controller 108 can be coupled to one or more detectors 134 in any suitable manner (e.g., via one or more transmission media, which may include "wired" and/or "wireless" transmission media) such that the computer subsystem can receive the output generated by the detectors during scanning of the specimen. In addition, the material characterization controller 106 can acquire a test image obtained by generating a real image of a portion of the specimen 128 via the optical imaging unit 122. For example, the computer subsystem and any other computer subsystem described herein can acquire the test image from the detector 134 or from images stored in a database 103 and/or 107. Computer subsystem 108 can also perform a number processing and filtering operations prior to sending the test image generated via the optical imaging unit 122 to the material characterization controller 106.

The imaging unit controller 108 can also be configured to perform one or more post-processing operations based on the output and/or images generated by the characterized image data generated by the material characterization controller 106. For example, the imaging unit controller 108 can perform a segmentation processing and/or a watershed analysis. The imaging unit controller 108 can also be configured to perform additional step(s) or functions such as, for example, generating quality analysis reports, displaying image processed segmentations of a specimen, and performing grain segmentation filtering.

The label controller 102 can be utilized to label defects or physical attributes in generated test images of the specimen 128. In at least one embodiment, the label controller 102 can assign labels to individual pixels of an image corresponding to results of detecting defects or attributes. In this manner, the label controller 102 can generate a label map, which can associate a label to each pixel of the image. The label map can be stored in a data base 103 for future reference. For instance, the label map or individual labels can be provided to a CGAN 104 during a training process in addition to the corresponding input (unlabeled) image of a specimen so as to enable the CGAN to detect defects or physical target attributes in the specimen 128. The target attributes can include, but are not limited to, pores, grains, blobs, particles, edges, etc.

As described further herein, the labels may indicate whether input features in the input feature map volume are associated with defects or not associated with defects. For example, the labels can include labels that indicate that no defect is present, i.e., "no defect" labels, or labels that indicate a defect is present, i.e., "defect detected" labels. In addition, as described further herein, the labels may indicate a type of defect or the type of physical attribute with which features in the input feature map volume are associated.

The label map can be created by the label controller 102 automatically by using a one-to-one matching technique (trainer). However, the label map can be created by using any suitable defect detection (and optionally defect classification) methods and systems by associating results of the defect detection (and optionally defect classification) with different portions of the images and/or different features determined for different portions of the images. For example, the images in the training dataset may be separated into blocks, and one or more features can be determined for each (or at least some) of the blocks as described further herein. The features that are determined for the different portions of the images can include any of the types of features described herein. In this manner, the label controller 102 can correlate the features determined for the blocks with the labels thereby creating an input feature map volume.

The material characterization controller 106 includes one or more generative adversary networks (CGANs) 104, which operate according to one or more conditional generative models. A conditional generative model can be generally defined as a model that is probabilistic in nature. In other words, a generative model is not one that performs forward simulation or rule-based approaches. As such, when a generative model is used to perform a testing operation as described further herein, a model of the physics of the processes involved in generating an actual image (for which a simulated image is being generated) is not necessary. Instead, as described further herein, one or more generative models can be learned (in that its parameters can be learned) based on a suitable training set of data. In one embodiment, the generative models implement a parameterized functional mapping comprising a set of adjustable parameters or weights. In at least one embodiment, the parameters and/or weigh values define one or more physical target attributes (e.g., grain sizes and ground truth edge locations) included in a previously analyzed real image of a specimen. In at least one embodiment, the model weights are used to represent a function, f(input_image)=output_image. In this manner, training the CGAN model solves for the function f(input_image).

The generative model includes a non-linear network configured for mapping blocks of pixels of an input feature map volume into labels, and the labels are indicative of one or more defect-related characteristics of blocks. For example, a convolutional neural network (CNN) is a non-linear network mapping each given block (e.g., M×N pixels) of an input feature map volume into a label. The blocks are blocks of pixels, which may have any suitable size. The blocks of pixels into which an image is separated may include a block of some size surrounding (and centered on when possible) each pixel in the image. In this manner, one block for one pixel in the image may include some pixels that are also in another block for another pixel. However, each block can include a set of pixels that is not the same as the set of pixels of any other block (i.e., no two of the blocks completely overlap in pixel space).

In some instances, the blocks may be mutually exclusive of each other. For example, pixels included in one block may not be included in any other block into which the image is separated. In such an instance, the blocks may be seen as non-overlapping tiles within the image. Furthermore, the blocks may include a combination of 1) some blocks that are mutually exclusive of all other blocks in the image and 2) some blocks that overlap with other blocks to some degree. The blocks in the image may also not extend across the entirety of the image. In this manner, some of the pixels in the image may not be included in any of the blocks. In addition, in one approach, labeling generated by the label controller 102 can correspond to the pixel level instead of the imaging level, which enables reducing the dataset from millions of images to a few tens of images.

In one embodiment, the labels indicate whether input features in the input feature map volume are associated with defects or are not associated with defects. For example, the labels may include "no defect" labels, and "defect" labels. Other similar phrases and/or numbers may be used as labels to differentiate whether input features are associated with defects or not. The labels may be further configured and assigned as described herein.

As described herein, the labels indicate a type of defect or type of physical attribute to which input features in the input feature map volume are associated. In another example, the labels may include a plurality of different label classes, e.g., "Class x" labels, "Class y" labels, etc. The different label classes can correspond to different characteristics of the specimen 128. For example, a first class (e.g., "Class x" labels) can serve to identify particles of crystalline metal grains, while a second class (e.g., "Class y" labels) can serve to identify edges of crystalline metal grains. The class labels, however, are not limited thereto. Accordingly, the labels can serve to differentiate one class of physical characteristics or defects of the specimen 128 from another class of physical characteristics or defects. These labels may also be further configured and assigned as described herein.

Figure 3:
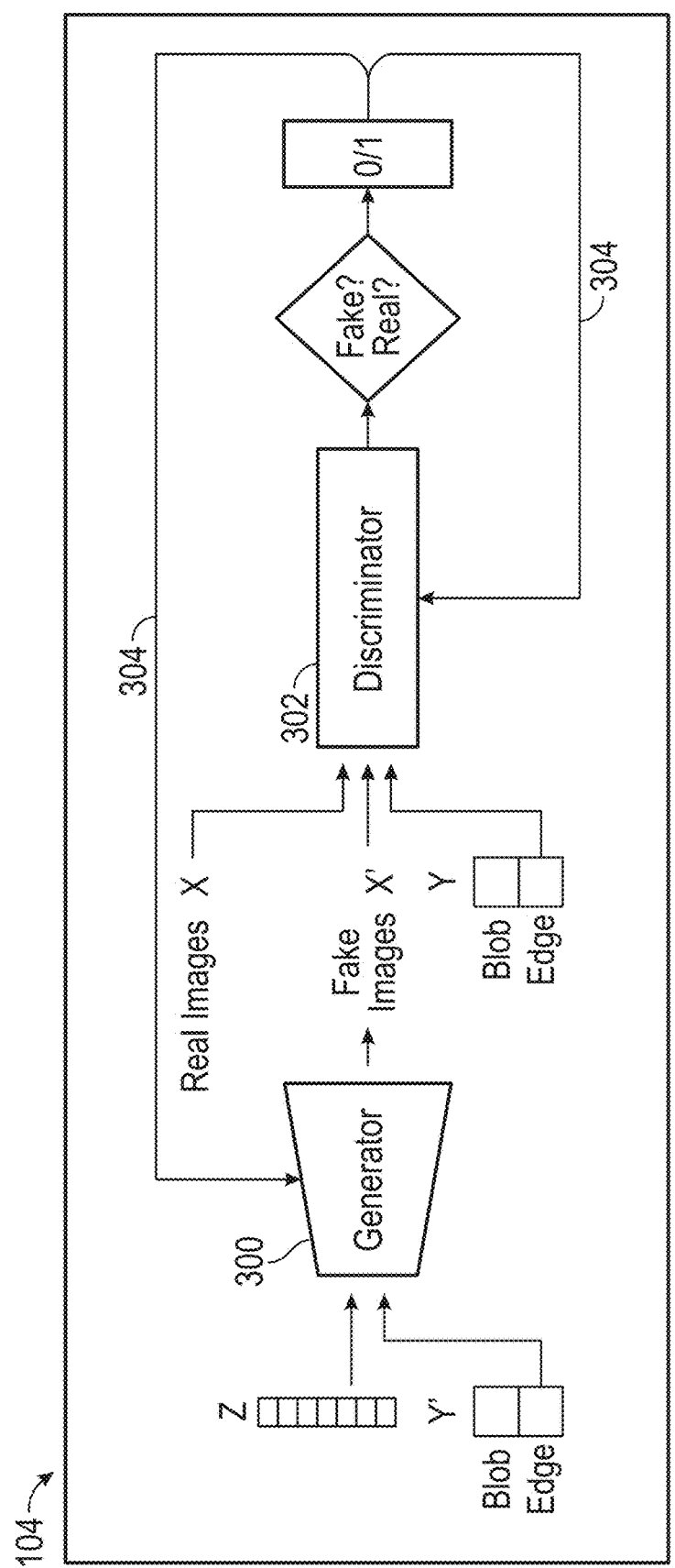
FIG. 3 is a block diagram of a CGAN included in the material characterization system according to a non-limiting embodiment.

In at least one embodiment, the GAN 104 is a conditional GAN 104 (CGAN 104), which can be configured to train a conditional model. That is, the CGAN 104 can be trained according to a discriminative learning technique. An example of a CGAN 104 is illustrated in FIG. 3. In at least one embodiment, the CGAN model 104 can be trained offline and stored. In this manner, the CGAN 104 can be utilized to evaluate any new image during a future material characterization process. The trained CGAN 104 can store a vast number (e.g., millions) of parameters and/or weight values, for example, which are "learned" via during the training process. The parameters and/or weighted values are used to map from an input image to another format that improves characterization analysis. For example, an input grayscale image can be converted to a black and white binary image which improves post-processing analysis and obtains more accurate post-analysis results and/or target metrics. For example, an input image (including but not limited to RGB, grayscale, Lab formats) can be converted to a selected output image format (e.g., a binary image format) highlighting specific objects of interest. In another embodiment, the input image may be converted to a multilevel image format, where each pixel value indicates the location of an attribute of the input image. This may eliminate or significantly reduce post-processing steps.

The CGAN 104 includes a generator 300 and a discriminator 302. The generator 300 samples a vector noise Z from a simple distribution (e.g., normal), along with conditional information Y', which describes some aspect of the distribution or sample data. In the case of a metal workpiece, for example, Y' may describe additional attributes such metal grain sizes (i.e., metal grain particles) and edge location or boundaries of individual grain elements. This attribute information Y and Y' is then input to both the generator 300 and the discriminator 302.

The discriminator 302 is input with real images (X) and synthetic or fake images (X') and learns to distinguish between them. In this case, the real image X may include a previously scanned real image of a portion of a metal workpiece specimen. The conditional inputs can include, for example, a previously generated "ground truth" image corresponding to the real image and a previously generated "ground truth" edge image corresponding to the real image. The "ground truth" images refer to the fact that their corresponding characteristics (e.g., individual grains and edge locations of the grains) have already been confirmed, thus are indicating "truthful" data. Accordingly, the "ground truth" image confirms the locations of the individual grain elements from the real image X, and the "ground truth" edge location image confirms the locations of the edges of the identified grain elements from the real image X.

The parameters learned by the CGAN 104 allow the discriminator 302 to map the ground truth grain elements and ground truth edge locations to the real image X, and stores the mapping in a database 107 for future reference. The process can be repeated several times until the database 107 is filled with an extensive number of mappings. After each iteration, a backpropagation technique is performed (e.g., using a backpropagation feedback path 304) which calculates the error contribution between the discriminator's ability to predict the detection of grain elements and edge locations, with its actual success in detecting grain elements and edge locations from a real image X. As iterations continue, the error rate of the CGAN 104 decreases, i.e., the ability to predict the detection of grain elements and edge locations improves. In this manner, the CGAN 104 can be trained to discriminate grain elements and edges in future test images generated from a specimen 128 processed in real-time with a high probability of success. In at least one embodiment, the discriminator 302 serves to assist in training the generator 300, and can be omitted after off-line training is complete.

Figure 4:
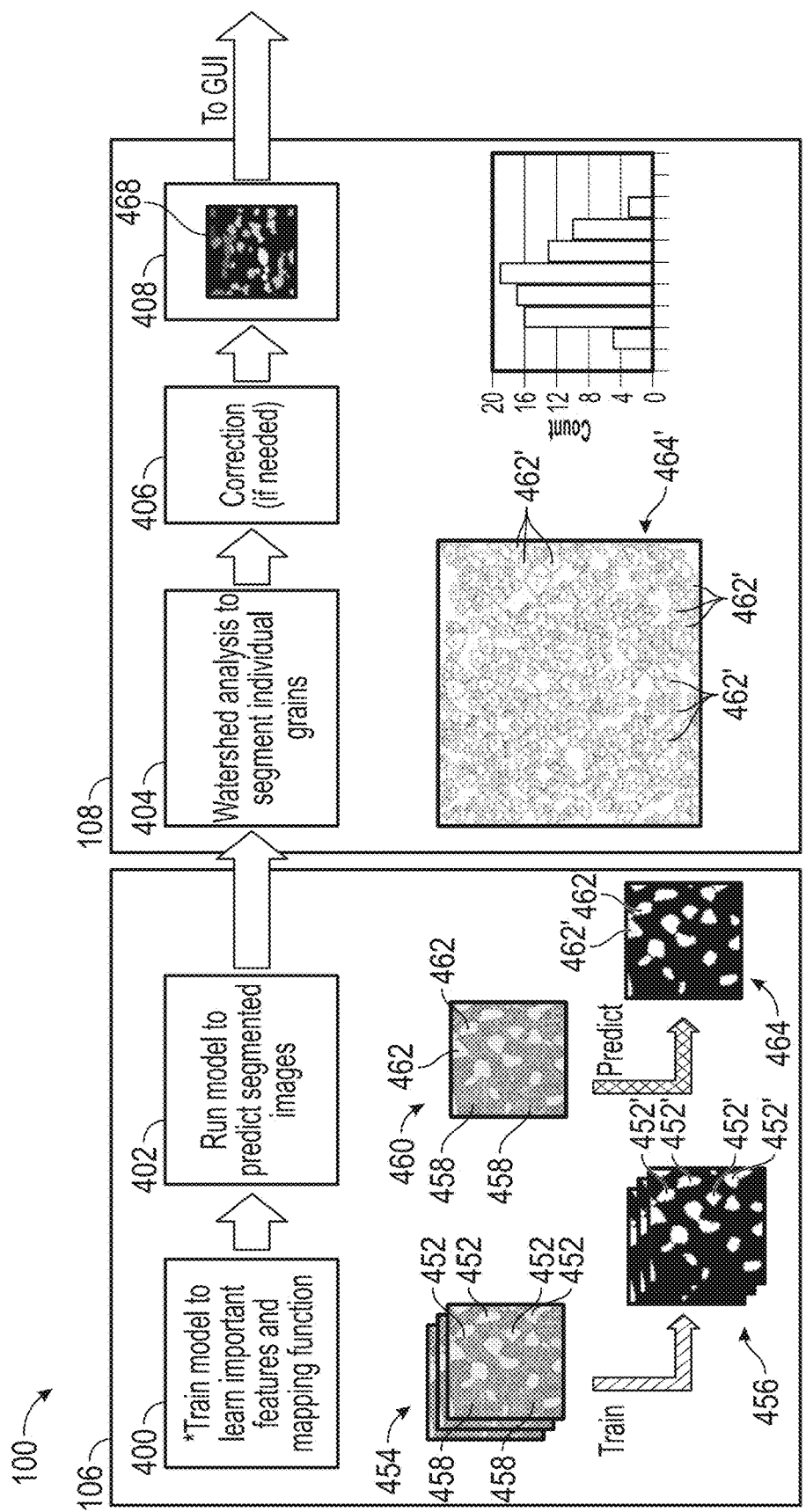
FIG. 4 is a diagram illustrating an automated process executed by a material characterization system for characterizing a test specimen according to a non-limiting embodiment.

Turning now to FIG. 4, a diagram illustrates an automated process executed by a material characterization system 100 for characterizing a test specimen 460 (i.e., sample material 460) according to a non-limiting embodiment of the disclosure. Although the material characterization system 100 is illustrated as including a material characterization controller 106 and an imaging unit controller 108, it should be appreciated that various other controllers described herein can be utilized to generate final characterization results pertaining to an input test specimen 450.

At operation 400, one or more CGANs 104 installed in the material characterization controller 106 undergoes a training process prior to performing material characterization on a given test specimen. The training process trains one or more attribute models corresponding to the type of test specimens (i.e., the type of materials) that can be characterized by the material characterization system 100. In an example where the type of specimens to be characterized is a metal material such as steel, for example, the models can include a metal grain size model and a metal grain edge location model. The metal grain size model indicates the various sizes of metal grains that can exist in a portion of steel specimen, while the grain edge location model indicates the edge locations or boundaries of individual metal grains located in proximity with one another.

The models are trained by mapping target attributes 452 included in a previously analyzed real image 454 of a specimen to known ground truth attributes 452' included in a ground truth image 456. The target attributes include, but are not limited to, pores, grains, blobs, particles, edges, particles or grain sizes ground truth edge locations, etc. In this manner, the CGAN(s) learn the one or more targeted attributes for future detection. As described herein, the targeted attributes can include, but are not limited to, pores, grains, blobs, particles, edges, grain/particle sizes, edge locations, etc. In other words, the one-to-one mapping between the ground truth attributes 452' and the real image attributes 452 trains the material characterization controller 106 to distinguish target attributes 452 (grain sizes and ground truth edge locations) included in the real image 454 of specimen from undesired characteristics 458 (i.e., noise 458) included in the real image 454. The results of the one-to-one mapping resulting from the functional mapping with a given set of parameters is compared against the desired output, or labeled image. The error between the output and the desired image is then used to adjust the values of the weights or parameters. As iterations continue, the error rate of the material characterization controller 106 decreases, i.e., the ability of the material characterization controller 106 to distinguish target attributes 452 from noise 458 is improved. In this manner, the material characterization controller 106 can be trained to identify target attributes in future previously analyzed test images 460 generated from a specimen 128 processed in real-time.

After the training process is completed, the material characterization controller 106 can process a previously unanalyzed test image 460 to distinguish target attributes 462 from noise 458. At operation 402, for instance, a previously unanalyzed test image 460 is obtained using the optical imaging unit 122 (not shown in FIG. 4). Based on the trained attribute models stored in memory, the material characterization controller 106 generates a synthetic image 464 which predicts the presence of target attributes 462' (e.g., identification of individual grains, the grain sizes, and the grain edge locations/boundaries of individual grains) of the test image 460. Based on the extensive training of the material characterization controller 106, the predicted target attributes 462' included in the synthetic image 464 have a one-to-one mapping, or are substantially mapped with a one-to-one correlation to the actual target attributes 462 included in the target image 460.

The synthetic image 464 can be further processed and analyzed to characterize the material of the specimen represented by the test image 460. At operation 404, for example, the synthetic image 464 can be obtained by the imaging unit controller 108 so that additional post-processing operations can be performed. The post-processing operations include, but are not limited to a watershed analysis or in-depth examination of the synthetic image 464. The watershed analysis can also include an image analysis of the predicted target attributes 462'. In one example, the watershed analysis confirms or corrects the predicted segmentation of the individual grains included in the synthetic image 464 representing a specimen that is currently undergoing material characterization.

In at least one embodiment, an optional correction operation can be performed at operation 406, which corrects the predicted segmentation performed by the material characterization controller 106. In this manner, the predicted attributes 462 can be refined such that the accuracy of the synthetic image 464 is improved with respect to the actual attributes of specimen represented by the test image 460.

At operation 408, the imaging unit controller 108 can generate various analytical results pertaining to the material characteristics of the specimen represented by the test image 460 (i.e., based on the test image 460 obtained by the imaging system 122). For example, the imaging unit controller 108 can generate analytical results indicating to the grain sizes, grain volume, area fractions, and grain size distributions allows the imaging unit controller 108 to characterize various properties of the specimen including, but not limited to, material strength (e.g., tensile strength), fatigue rate, fracture growth rate, and other intrinsic material properties (mechanical, durability, thermal, etc. In at least one embodiment, the results generated at operation 408 can be utilized to generate characterized image data. The characterized image data can be output to a graphical user interface (GUI) 466 and represented as a characterized image 468. The characterized image 468 can show segmented grains, along with augmented graphics indicating expected fracture areas or stress points. The expected fracture areas, stress points, or material strength at particular regions can be displayed using a graphical indicator such as colors and/or augmented graphics corresponding to stress intensities or strength measurements. In this manner, a technician can quickly and conveniently realize various characterized properties of the specimen current undergoing material characterization.

Figure 5:
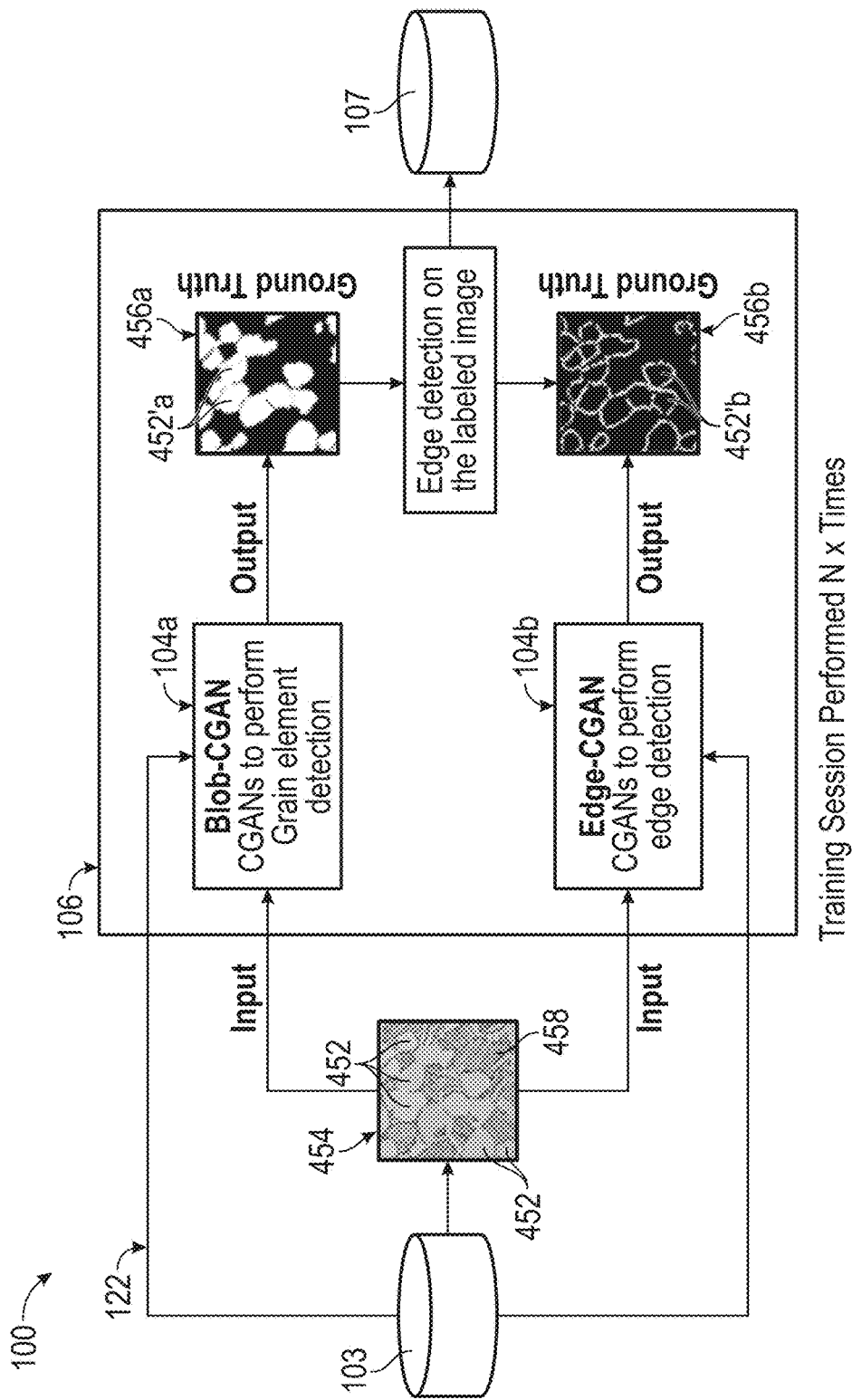
FIG. 5 is diagram illustrating a training process applied to the material characterization controller 106 according to a non-limiting embodiment.

Turning now to FIG. 5, a process of training the material characterization controller 106 is illustrated according to a non-limiting embodiment. The material characterization controller 106 executes the training process prior to analyzing a test image generated by the imaging unit 122.

In at least one embodiment, the material characterization controller 106 includes a first CGAN network 104a and a second CGAN network 104b. The first CGAN network 104a is trained to detect a first target attribute such as, for example, the presence of grain elements 452. The second CGAN network 104b is trained to detect a different target attribute such as, for example, edge locations or boundaries of one or more detected grain elements 452.

The first and second CGAN networks 104a and 104b are in signal communication with the imaging unit 122. The imaging unit 122 is in signal communication with a database 103 that stores several previously generated real images 454, and previously analyzed ground truth images 456a and 456b that correspond to a given real image 454. The ground truth images 456a and 456b have been previously analyzed, and thus are known to have a one-to-one mapping between their respective ground truth attributes 452'a and 452'b and the real attributes 452 included in a given real image 454. By performing several iterations of comparing the ground truth images 456a and 456b to its corresponding real image 454, the material characterization controller 106 learns to distinguish target attributes 452 from non-target attributes 458 (i.e., noise). For example, the first CGAN network 104a learns to distinguish individual metal grain elements 452 from non-grain containing surrounding areas 458 of the specimen, while the second CGAN network 104b learns to various edge locations and boundary shapes such that it can distinguish between neighboring metal grain elements 452. The comparison allows the CGAN network to determine a plurality of the learned parameters included in a ground truth image. The learned parameters can then be applied to each new test image during a future time period to predict a presence of at least one target attribute of the specimen.

Figure 6:
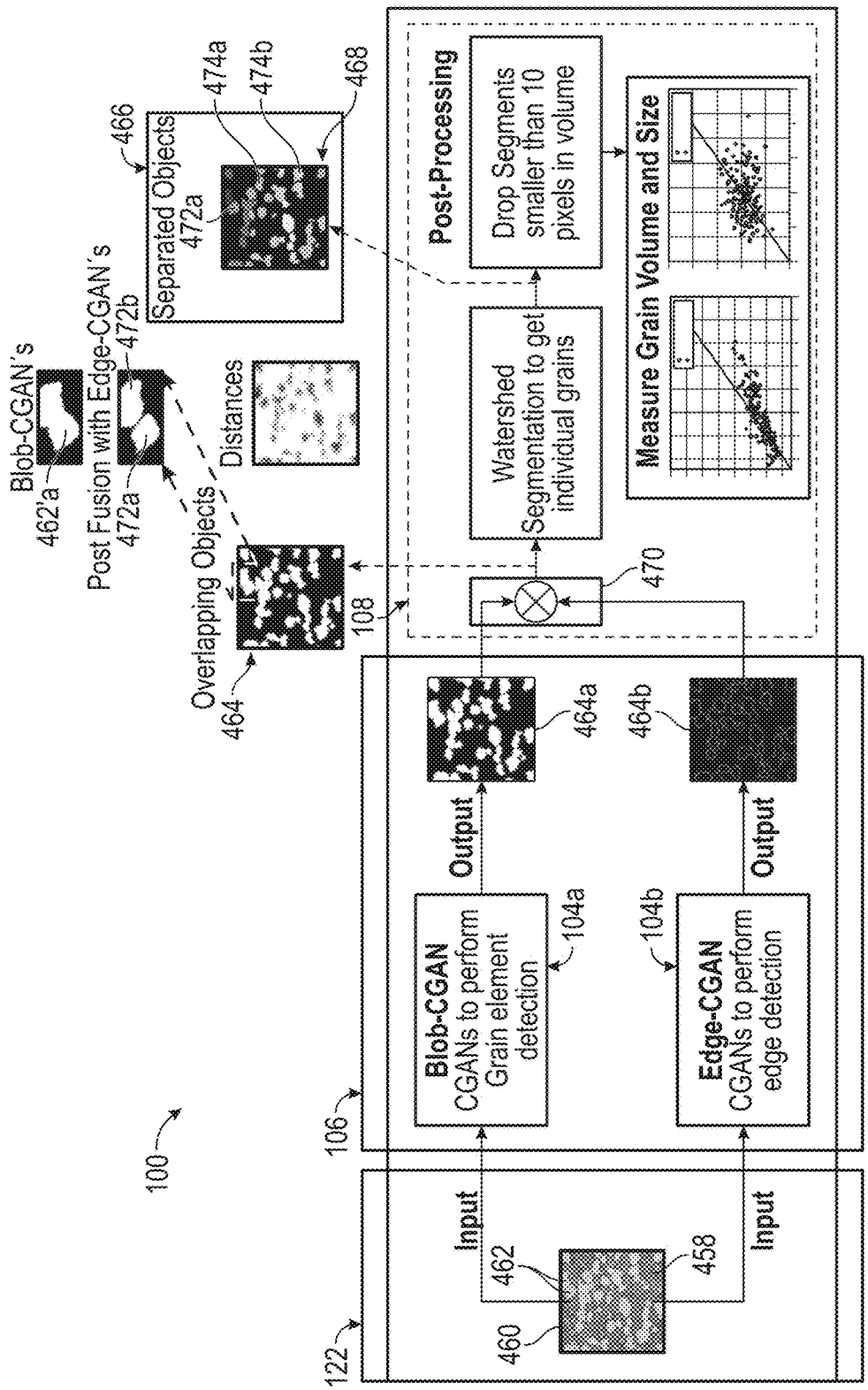
FIG. 6 illustrates a material characterization controller performing a material characterization process to characterize the material of a specimen undergoing analysis according to a non-limiting embodiment.

Referring to FIG. 6, a material characterization controller 106 is illustrated performing a material characterization process to characterize the material of a specimen according to a non-limiting embodiment. As described herein, the material characterization controller 106 is configured to perform an automated material characterization analysis that predicts the presence of one or more physical attributes included in a test specimen, and generates a synthetic image that includes one or more predicted attributes. The predicted attributes in the synthetic image have a one-to-one mapping (i.e., are mapped one-to-one or substantially one-to-one) with the real physical attributes of the specimen represented in the test image. In this manner, the material characterization system can automatically characterize a material of test specimen based on the predicted at least one attribute included in the synthetic image without human interaction.

The material characterization controller 106 is illustrated as being in signal communication with an imaging unit 122. The imaging unit 122 is configured to generate a test image 460 of a currently tested specimen. The tested specimen is composed of a material (e.g., steel) that includes one or more target attribute 462 to be detected from among a non-target attribute 458 (i.e., noise).

The electronic material characterization controller 106 is configured to predict a presence of one or more target attributes of the specimen based on a plurality of ground truth parameters included in a ground truth image that are learned prior to generating the test image. The learned parameters are then applied to each new test image to convert from input image to desired output image format e.g., a binary data image format) to predict a presence of one or more target attributes of the specimen.

In at least one non-limiting embodiment, the target attributes include grain elements and edge locations or grain boundaries. The electronic material characterization controller 106 can then generate a synthetic image 464 including the predicted attributes 462'a and 462'b. Based on the predicted attribute 462'a and 462'b included in the synthetic image 464, the electronic imaging unit controller 108 performs a material characterization analysis that characterizes the material of the specimen.

To determine the predicted attributes, the material characterization controller 106 can include a plurality of CGANs. Each CGAN can be configured to predict the presence of a respective target attribute. In the example illustrated in FIG. 6, the material characterization controller 106 includes a first CGAN 104a and a second CGAN 104B. The first CGAN 104a is configured to predict the presence of one or more grain elements 462a in the specimen. The second CGAN 104B is configured to predict an edge location 462b of the at least one grain element 462a. The first CGAN 104a generates generate a first synthetic image 464a that includes the predicted grain element(s) 462a, while the second synthetic image 464b that includes the predicted edge location 462b of the predicted grain element(s) 462a, The first and second synthetic images 464a and 464b are then fused together by an image fusing unit 470 to generate the synthetic image 464 (i.e. a fused synthetic image 464). The fused synthetic image 464 can be generated by the image fusing unit 470 in response to superimposing the second synthetic image 464b with the first synthetic image 464a. In this manner, the predicted edge locations are superimposed with the predicted grain elements to identify one or more individually segmented grains 472a and 472b.

The fused synthetic image 464 is then post-processed by the imaging unit controller 108 to perform a material characterization analysis that characterizes the material of the specimen. The material characterization analysis includes characterizing at least one of material strength (e.g., tensile strength), fatigue rate, fracture growth rate, and other intrinsic material properties (mechanical, durability, thermal, etc. In at least one embodiment, the imaging unit controller 108 can perform various different post-processing operations on the fused synthetic image 464. The post-processing operations include, but are not limited to, a watershed analysis, a post-segmentation operation, a synthetic image correcting operation, and a grain filtering operation.

In at least one embodiment, the imaging unit controller 108 can also generate characterized image data based on the fused synthetic image 464 and the material characterization analysis. The characterized image data can then be output to a display unit that 466, which displays a characterized image 468 based on the characterized image data. The characterized image 468 can include one or more graphical indicators 474a and 474b that indicate analyzed characteristics of the specimen's material such as, for example, the material strength (e.g., tensile strength), fatigue rate, fracture growth rate, and other intrinsic material properties (mechanical, durability, thermal, etc.

As described herein, at least one embodiment of the disclosure provides a material characterization system that includes an electronic imaging unit controller 108 that learns physical attributes included in materials of specimens. The electronic imaging unit controller 108 is then configured to perform a material characterization analysis that predicts the presence of at least one attribute included in a test specimen, and to generate a synthetic image that includes one or more predicted attributes. The predicted attributes in the synthetic image have a one-to-one mapping (i.e., are mapped one-to-one or substantially one-to-one) with the real physical attributes of the specimen represented in the test image. In this manner, the material characterization system can automatically characterize a material of a test specimen based on the predicted attributes included in the synthetic image without human interaction. The automated material characterization performed by the material characterization system significantly decreases material characterization analytical tasks, reduced hours previously need to manually characterize materials, and significantly reduces manual labor costs and analytical monetary expenses.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A material characterization system comprising:

an electronic imaging unit configured to generate at least one test input image of a specimen composed of a material;

an electronic material characterization controller configured to determine values of a plurality of functional parameters that specify a functional mapping, to map the at least one test input image of the specimen to at least one output image based on the functional mapping specified by the determined parameters, to predict a presence of at least one target attribute of the specimen in response to applying the functional mapping and analyzing the at least one output image, and to convert the at least one output image to a selected output image format so as to generate a synthetic image including the predicted at least one attribute; and an electronic imaging unit controller configured to perform a material characterization analysis that characterizes the material of the specimen based on the predicted at least one attribute included in the synthetic image;

wherein the synthetic image is a fused synthetic image including a plurality of predicted attributes that are different from one another;

the material characterization controller includes a plurality of conditional generative adversarial networks (CGANs) and, each CGAN and among the plurality of CGANs configured to predict the presence of a respective attribute;

the plurality of CGANs includes:

a first CGAN confirmed to predict a presence of at least one grain element in the specimen, and to generate a first synthetic image including the predicted at least one grain element; and a second CGAN configured to predict an edge location of the least one grain element, and to generate a second synthetic image including the predicted edge location of the at least one grain element the imaging unit controller includes an electronic image fusing unit that superimposes the second synthetic image with the first synthetic image to generate the fused synthetic image;

the superimposition of predicted edge locations with predicted grain elements identifies at least one individually segmented grain;

the imaging unit controller is configured to perform at least one post-processing operation on the fused synthetic image; and the material characterization analysis includes characterizing at least one of a strength of the material, a fatigue rate of the material, and fracture growth rate.

2. The material characterization system of claim 1, wherein at least one post-processing operation on the fused synthetic image includes at least one of a watershed analysis, a post-segmentation operation, a synthetic image correcting operation, and a grain filtering operation.

3. The material characterization system of claim 1, wherein the imaging unit controller generates characterized image data based on the fused synthetic image and the material characterization analysis.

4. The material characterization system of claim 3, further comprising a display unit that displays a characterized image based on the characterized image data.

5. The material characterization system of claim 4, wherein the characterized image includes at least one graphical indicator that indicates at least one of the strength of the material, the fatigue rate of the material, and fracture growth rate.

6. The material characterization system of claim 1, wherein the material characterization controller executes a training process prior to generating the test image.

7. The material characterization system of claim 6, wherein the material characterization controller learns the modeled parameters in response to identifying known attributes of a previously analyzed specimen based on a comparison between the real image and the known ground truth image.

8. The material characterization system of claim 7, wherein the learned ground truth images include the known ground truth attributes.

* * * * *